(12) United States Patent
Tsern et al.

(10) Patent No.: US 8,595,336 B1
(45) Date of Patent: Nov. 26, 2013

(54) PORTABLE UNIVERSAL PERSONAL STORAGE, ENTERTAINMENT, AND COMMUNICATION DEVICE

(75) Inventors: Ely Tsern, Los Altos, CA (US); Megan Tsern, Los Altos, CA (US); David Mooring, Los Altos Hills, CA (US); Michael Mooring, Los Altos Hills, CA (US)

(73) Assignee: WIMM Labs, Inc., Los Altos, CA (US)

( * ) Notice: Subject to any disclaimer, the term of this patent is extended or adjusted under 35 U.S.C. 154(b) by 620 days.

(21) Appl. No.: 12/179,176

(22) Filed: Jul. 24, 2008

Related U.S. Application Data

(60) Provisional application No. 61/025,728, filed on Feb. 1, 2008.

(51) Int. Cl.
 *G06F 15/16* (2006.01)
 *G06F 15/167* (2006.01)
 *G06F 15/177* (2006.01)

(52) U.S. Cl.
 USPC ............ 709/221; 709/212; 709/227; 709/248

(58) Field of Classification Search
 USPC ................................. 709/248, 212, 221, 227
 See application file for complete search history.

(56) References Cited

U.S. PATENT DOCUMENTS

| | | | | |
|---|---|---|---|---|
| 5,987,376 A | * | 11/1999 | Olson et al. | 709/248 |
| 6,039,648 A | * | 3/2000 | Guinn et al. | 463/16 |
| 6,311,209 B1 | * | 10/2001 | Olson et al. | 709/248 |
| 6,315,668 B1 | * | 11/2001 | Metke et al. | 463/42 |
| 6,346,048 B1 | * | 2/2002 | Ogawa et al. | 463/42 |
| 6,361,440 B1 | * | 3/2002 | Ogawa et al. | 463/42 |
| 6,560,636 B2 | * | 5/2003 | Cohen et al. | 709/248 |
| 6,682,423 B2 | | 1/2004 | Brosnan et al. | |
| 6,875,110 B1 | | 4/2005 | Crumby | |
| 6,884,174 B2 | | 4/2005 | Lundy et al. | |
| 6,951,516 B1 | * | 10/2005 | Eguchi et al. | 463/40 |
| 7,097,559 B2 | * | 8/2006 | Okita et al. | 463/11 |
| 7,154,862 B2 | | 12/2006 | Krzyzanowski | |
| 7,574,493 B2 | * | 8/2009 | Hutcheson et al. | 709/221 |

(Continued)

FOREIGN PATENT DOCUMENTS

| | | |
|---|---|---|
| KR | 1020000018155 A | 4/2000 |
| KR | 1020050082597 A | 8/2005 |

(Continued)

*Primary Examiner* — Ian N Moore
*Assistant Examiner* — Jenee Alexander
(74) *Attorney, Agent, or Firm* — Convergent Law Group LLP

(57) ABSTRACT

Portable devices for synchronizing configuration states across a plurality of computing platforms, as well as providing interactivity between the platforms. In one aspect, a portable device comprises a processor and a memory. The memory associates a plurality of computing devices with a plurality of synchronization protocols. The portable device detects a presence of a first computing device on a network; connects to the first computing device on identifies the type of the first computing device; identifies a synchronization protocol associated with the type of the first computing device; sends a configuration state from the portable device to the first computing device according to the identified synchronization protocol, wherein the first computing device updates the configuration state according to user input on the computing device; receives an updated configuration state from the first computing device; and stores the updated configuration state on the portable device. In another aspect, a portable device provides consistent character experience across a plurality of devices. In another aspect, a portable device provides parental control and the ability to implement and update restrictions on availability of device features.

2 Claims, 6 Drawing Sheets

(56) References Cited

U.S. PATENT DOCUMENTS

| | | | |
|---|---|---|---|
| 7,613,835 B2 * | 11/2009 | Sato | 709/246 |
| 7,640,297 B2 * | 12/2009 | Obata | 709/227 |
| 7,909,694 B2 * | 3/2011 | Schugar | 463/25 |
| 7,931,533 B2 * | 4/2011 | LeMay et al. | 463/29 |
| 2002/0035604 A1 * | 3/2002 | Cohen et al. | 709/227 |
| 2003/0177187 A1 | 9/2003 | Levine et al. | |
| 2005/0033829 A1 * | 2/2005 | Oommen | 709/220 |
| 2005/0208967 A1 | 9/2005 | Buniatyan | |
| 2006/0014547 A1 * | 1/2006 | Walter | 455/456.1 |
| 2006/0030408 A1 * | 2/2006 | Kiiskinen | 463/42 |
| 2006/0189388 A1 * | 8/2006 | Hartman et al. | 463/42 |
| 2007/0010328 A1 * | 1/2007 | Yokota et al. | 463/42 |
| 2007/0260751 A1 * | 11/2007 | Meesseman | 709/248 |
| 2008/0126568 A1 * | 5/2008 | Otoshi et al. | 709/248 |
| 2008/0141293 A1 * | 6/2008 | Blanchard et al. | 725/28 |
| 2008/0220878 A1 * | 9/2008 | Michaelis | 463/42 |
| 2009/0124393 A1 | 5/2009 | Kuwahara et al. | |

FOREIGN PATENT DOCUMENTS

| | | |
|---|---|---|
| KR | 100522454 B1 | 10/2005 |
| TW | 1226254 B | 1/2005 |
| WO | 2006039132 | 4/2006 |

* cited by examiner

PORTABLE UNIVERSAL PERSONAL STORAGE, ENTERTAINMENT, AND COMMUNICATION DEVICE

CROSS-REFERENCE TO RELATED APPLICATIONS

This application claims priority to U.S. Provisional Patent Application No. 61/025,728, filed on Feb. 1, 2008.

BACKGROUND

1. Field

The field of the present invention relates generally to portable devices, and specifically to portable devices for personal storage and communication and for providing synchronization of configuration states as well as interactivity across a plurality of platforms.

2. Related Art

Computing platforms, such as personal computers and gaming consoles, represent a wide variety of hardware architectures, software environments, configuration data formats, and communication protocols. While this variety provides a diversity of choices to users, it also presents a challenge with respect to providing a consistent experience to users who regularly use different types of platforms, as well as interactivity between the different platforms.

For example, while a user may play the same game on a game console, on a portable gaming system, and over the Internet on a personal computer, the game experience is in general that of playing three different copies of the same game, and not that of playing one game using three different platforms. Therefore, it is desirable to allow for cross platform synchronization of game states or configuration data states and for providing interactivity between the platforms, thereby providing a consistent experience to the user.

SUMMARY

Embodiments of the present invention are directed to portable devices for synchronizing configuration states across a plurality of computing platforms, as well as providing interactivity between the platforms. In one aspect, a portable device comprises a processor and a memory. The memory associates a plurality of computing devices with a plurality of synchronization protocols. The portable device detects a presence of a first computing device on a network; connects to the first computing device on identifies the type of the first computing device; identifies a synchronization protocol associated with the type of the first computing device; sends a configuration state from the portable device to the first computing device according to the identified synchronization protocol, wherein the first computing device updates the configuration state according to user input on the computing device; receives an updated configuration state from the first computing device; and stores the updated configuration state on the portable device.

Optionally, the portable device translates the updated configuration state to a data format used by a second computing device, wherein the first and second computing devices do not share a common configuration state data format, and stores the updated configuration state on the portable device.

Optionally, the portable device is configured to communicate using one of a plurality of network protocols, and each synchronization protocol indicates a network protocol to be used for synchronization.

Optionally, the game state includes billing information, purchase history, or accessory download credits.

In another aspect, a portable device is disclosed for providing consistent character experience across a plurality of devices, and in one particular aspect across a plurality of portable devices. The portable device stores a first character state; detects a presence of a second wireless portable device in wireless range; connects to the second portable device; and sends the first character state to the second portable device and locally stores information to indicate that the character has moved to the second portable device.

Optionally, the portable device further receives an updated second character state from the second portable device, the updated second character state resulting from the second portable device updating the first character state according to modification on the second portable device; and stores the updated second character state and modifies the locally stored information to indicate that the character has moved back to the first portable device.

Other aspects are described, in accordance with embodiments of the present invention, such as for providing parental control and for implementing and updating restrictions on availability of device features.

BRIEF DESCRIPTION OF DRAWINGS

The drawings illustrate the design and utility of embodiments of the present invention, in which similar elements are referred to by common reference numerals. In order to better appreciate the advantages and objects of the embodiments of the present invention, reference should be made to the accompanying drawings that illustrate these embodiments. However, the drawings depict only some embodiments of the invention, and should not be taken as limiting its scope. With this caveat, embodiments of the invention will be described and explained with additional specificity and detail through the use of the accompanying drawings in which.

DETAILED DESCRIPTION

In the following description, for purposes of explanation, numerous specific details are set forth in order to provide a thorough understanding of the invention. It will be apparent, however, to one skilled in the art that the invention can be practiced without these specific details.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1:
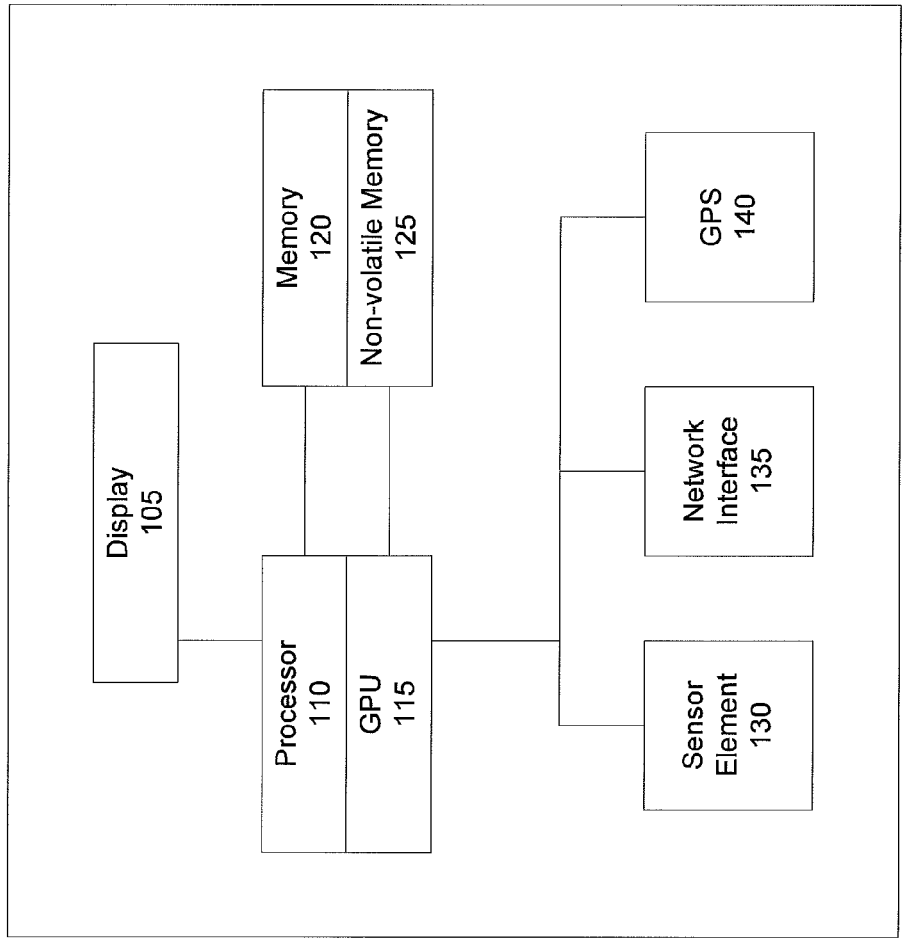
FIG. 1 is a block diagram illustrating a portable electronic data and communication device configured to synchronize configuration states across a plurality of computing.

FIG. 1 is a block diagram illustrating a portable electronic data and communication device (hereinafter also referred to as portable device) 100 configured to synchronize configuration states across a plurality of computing platforms, in accordance with an embodiment of the present invention. Portable device 100 comprises a display 105 coupled to a processor 110. Coupled to the processor 110 are a memory element 120 and a non-volatile memory element 125. Optionally, the processor 110 may comprise a graphics processing unit 115 (GPU) for providing additional computational power for processing and displaying graphics.

Optionally, the portable device 100 may comprise one or more sensor elements 130 coupled to the processor 110. Examples of such sensor elements include, but are not limited to, infra-red (IR) detectors, inertial motion sensors, biosensors, ambient light sensors, or any other sensors. Sensor elements 130 allow the portable device 100 to act as a game controller or other input device that operates individually or together with other game controllers or input devices. In one embodiment, motion sensors on the portable device could monitor physical activity. For example, parents may use such an embodiment to gauge the amount physical activity that their children are engaging in.

The portable device 100 comprises one or more network interface elements 135 coupled to the processor 110. The network interface elements 135 support one or more network wired or wireless protocols and types, such as Bluetooth, WiFi (such as an IEEE 802.11 protocol), Worldwide Interoperability for Microwave Access (WiMAX), Global System for Mobile communications (GSM), General Packet Radio Service (GPRS), Code division multiple access (CDMA), wide area cellular networks such as 3G cellular, various wireless spectra such as 700 MHz, low power protocols such as ZigBee, IR sensing, or any other protocol for communicating over a wired or wireless network. Optionally, the portable device 100 comprises a global positioning system (GPS) element 140, coupled to the processor 110, for sensing a location of the portable device 100.

In one embodiment, the portable device may be implemented as a modular movement that is removably inserted into a receptacle formed into the case of a portable device, such as a watch, for example.

In one embodiment, non-volatile memory element 125 of portable device 100 stores one or more data structures for associating a plurality of computing device types (or individual computing device instances) with one or more synchronization protocols. This allows for synchronization of configuration states across a plurality of computing platforms. The computing platforms may be heterogeneous, with the portable device 100 serving as a device capable of communicating and synchronizing with such a heterogeneous variety of computing devices. As understood herein, the term "synchronization protocol" is interpreted and construed broadly to mean a specific data transfer or exchange protocol used to transfer or exchange configuration state information.

In another embodiment, the non-volatile memory 125 may comprise one or more data structures associating an incoming identifying signal, sent by a computing device in communication with the portable device 100, with a specific synchronization protocol, thereby allowing a computing device to identify its own synchronization protocol to the portable device 100 to allow synchronization between the two devices.

Optionally, a handheld game console may have a receptacle for the portable device 100 to plug into, allowing a game (or other application) to use the processing power of both the portable device 100 and the handheld game console. This provides increased flexibility for the game engine by allowing the engine to concurrently utilize multiple platforms. Similarly, games or applications may be transferred between platforms that way.

Figure 2:
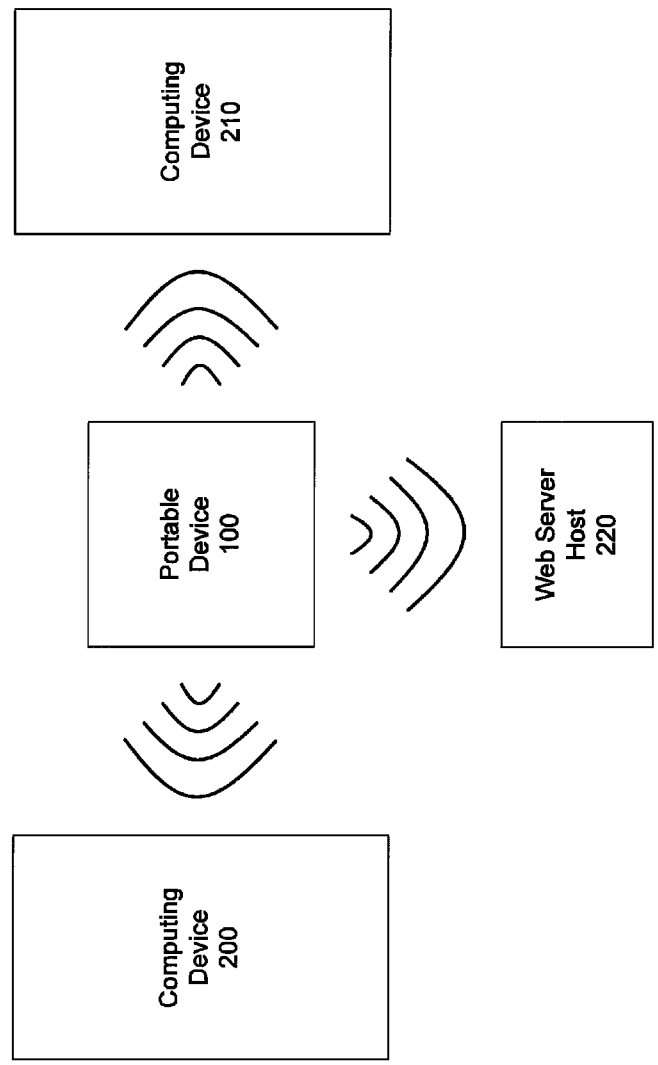
FIG. 2 is a system diagram illustrating a portable electronic data and communication device in communication with one or more computing devices.

FIG. 2 is a system diagram illustrating a portable device 100 in communication with one or more computing devices, in accordance with an embodiment of the present invention. One or more computing devices 200, 210 communicate with the portable device 100 over one or more wireless or wired links, using one or more network protocols. Examples of such computing devices include, but are not limited to, handheld gaming devices, web server hosts, game consoles, cellular phones or other cellular devices, personal computers, set-top boxes, or any other computing device capable of communicating over a network with portable device 100.

Optionally, one or more computing devices 200, 210 may communicate with the portable device 100 using a wireless protocol such as Bluetooth, an IR protocol, wireless local area network (LAN) or wide area network (WAN) protocols, or any other wireless protocol. Optionally the portable device 100 may communicate with a web server host 220 or personal computer through a wired or wireless Internet connection. Computing devices 200, 210 may comprise a game console such as Nintendo™ Wii, Microsoft™ Xbox 360, Sony™ PlayStation, Nintendo™ Game Boy, Sony™ PlayStation Portable (PSP), the Tamagotchi™, or any other game console or device.

In one embodiment, the portable device 100 may act as an extended display of a video game being played on a game console. This display 105 may be used to display information, graphics, or gaming options intended only for that user, such as football play options, or special attack moves options, or secret character selections. The display 105 may have a touchscreen interface allowing users to make simple selections. Game play data, coordinated with the video game being played on the console, may be transmitted to and from the portable device 100 in real-time.

Figure 3:
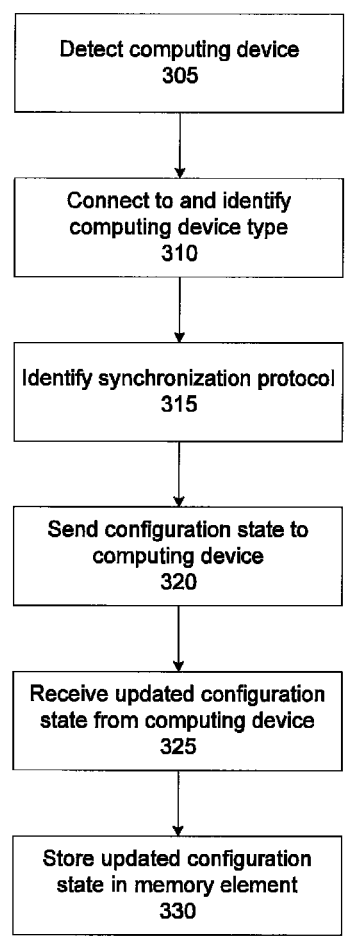
FIG. 3 is a flow diagram illustrating a method for synchronizing configuration states across a plurality of computing platforms in accordance with an embodiment of the present invention.

FIG. 3 is a flow diagram illustrating a method for synchronizing configuration states across a plurality of computing platforms, using the portable device 100, in accordance with an embodiment of the present invention. At step 305, the portable device 100 detects the presence of a computing device 200 on a network. Optionally, the network may be wired, wireless, or comprise any other networking means. At step 310, the portable device 100 connects to the detected computing device 200 and identifies the type of the computing device 200.

In one embodiment, the computing device 200 may be a game console connecting with the portable device 100 over a wireless network. The portable device 100 may use wireless detection and auto-connection with a computing device 200 when the computing device 200 is turned on and the portable device 100 is within wireless range.

At step 315, the portable device 100 identifies a synchronization protocol associated with the type of the computing device 200. The portable device 100 uses the one or more data structures in the memory element 125, as described above, to perform the identification.

At step 320, the portable device 100 sends a configuration state to the computing device 200 using the identified synchronization protocol from step 315. The configuration state may indicate a state of computation on portable device 100, such as an application state, a game state, or any other computation state. In the case of a game state, the configuration state may optionally include billing information, purchase history, accessory download credits, or any other financial information related to the game or game play.

At step 325, the portable device 100 receives an updated configuration state from the computing device 200. This is typically after the computing device 200 has performed some computing (such as game play, application processing, or other computation) and as a result have produced an updated configuration state. At step 330, the portable device 100 stores the updated configuration state in memory element 120 or 125 for further processing or later reference.

In one embodiment the portable device 100 translates the updated configuration state to a data format to be used by a second computing device 210, wherein the first and second computing devices 200, 210 do not share a common configuration state data format. The updated translated configuration state is then stored on the portable device 100, ready to be used by a second computing device 210 upon connecting with the portable device 100.

In an alternative embodiment, the memory element 120 of the portable device 100 need not associate a plurality of computing device types (or individual computing device instances) with a plurality of synchronization protocols. Instead, the portable device 100 may receive the synchronization protocol from the computing device 200 upon connecting with the computing device 200. An advantageous aspect of this embodiment is that portable device 100 need not be pre-configured with the synchronization protocol for synchronizing with computing device 200, but instead receives the appropriate synchronization protocol upon connecting with the computing device 200.

Figure 4:
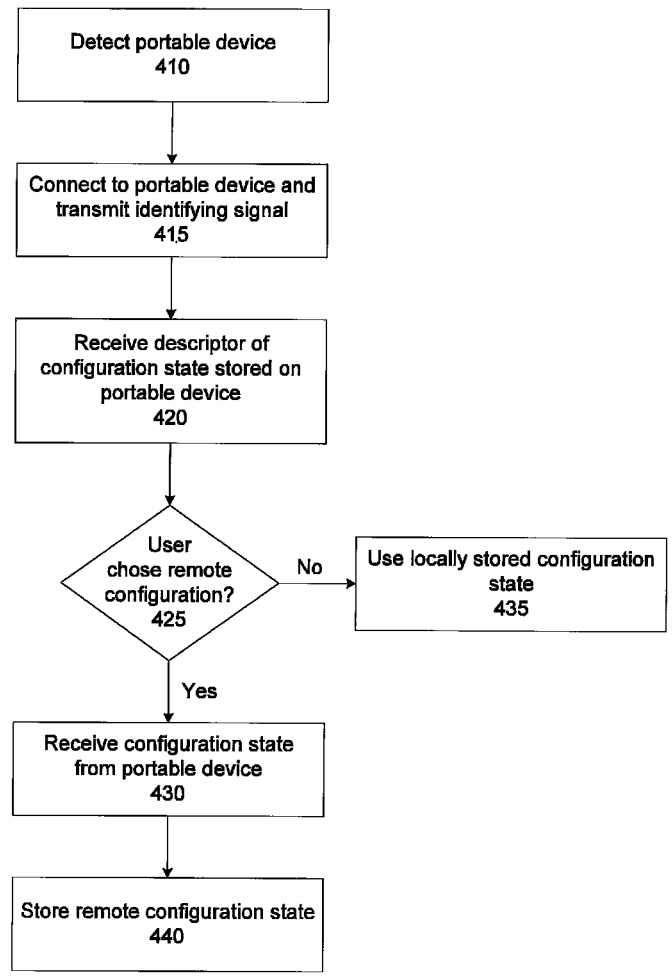
FIG. 4 is a flow diagram illustrating a method for a computing device 200 to synchronize configuration states to a portable electronic data and communication device 100 in accordance with an embodiment of the present invention.

FIG. 4 is a flow diagram illustrating a method for a computing device 200 to synchronize configuration states with a portable device 100, in accordance with an embodiment of the present invention. At step 410, the computing device 200 detects a presence of a portable device 100 in a wired or wireless network. At step 415, the computing device 200 connects to the portable device 100 and transmits a signal identifying the type of the computing device 200 to the portable device 100. Optionally, the computing device 200 first prompts the user to connect to the portable device 100, and only connects when the user chooses to connect. In one embodiment, the computing device 200 is a gaming console in communication with the portable device 100 over a wireless network. At step 420, the computing device 200 receives from the portable device 100 a descriptor of a configuration state stored on the portable device 100, i.e. stored remotely with respect to the computing device 200. In one embodiment, the computing device 200 searches the portable device 100 for one or more such configuration states stored on the portable device 100. In another embodiment, the computing device 200 simply receives one or more such descriptors from the portable device 100, without initiating a search on the portable device 100.

At that point, the computing device 200 presents a user of the computing device 200 with a choice of obtaining the configuration stated remotely on the portable device 100, or continuing to use the configuration state stored locally on the computing device 200. In effect, this allows the user of computing device 200 to choose from a set of configuration states that is distributed and broader that the set of configuration states stored locally on the computing device 200. Note that this is not limited to obtaining configuration state descriptors from only one portable device 100, but extends analogously to any number of remotely stored configuration states that, while not stored locally on the computing device 200, are nevertheless available to the computing device 200 over one or more networks.

At step 425, the computing device 200 receives an input from the user indicating the user's choice of whether or not to obtain a user-selected remote configuration state. If the user input indicates that the user wishes to obtain a user-selected remotely stored configuration state, at step 430 the computing device 200 receives the configuration state from the portable device 100. Otherwise, at step 435, the locally stored configuration state is used by the computing device 200. At step 440, if the remote configuration state was received, the computing device 200 stores the remote configuration state. Optionally, the local and remote configuration states may indicate local and remote game states.

In an alternative embodiment, the portable device 100 may have an auto-synchronization option, where data on portable device 100 is synchronized to the memory on the computing device 200.

Figure 5:
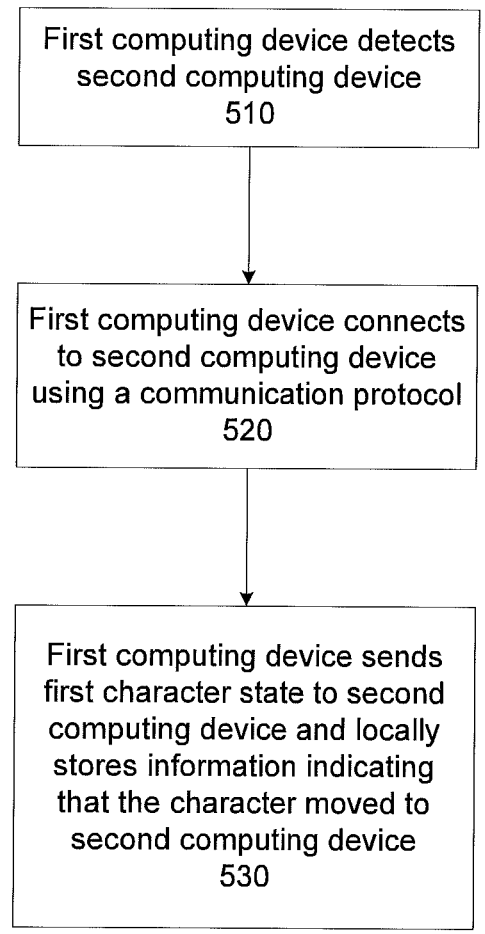
FIG. 5 is a flow diagram illustrating a method for providing a consistent character experience across a plurality of computing devices.

FIG. 5 is a flow diagram illustrating a method for a first computing device, which stores a first character state, to provide a consistent character experience across a plurality of computing devices, in accordance with an embodiment of the present invention. At step 510, a first computing device 200 detects the presence of a second computing device 210. At step 520, the first computing device 200 connects to the second computing device 210 using a communication protocol. Optionally, the first and second computing devices 200, 210 may be game consoles in communication via a wireless network. In a particularly useful embodiment, the computing device is a wireless portable device.

At step 530, the first computing device 200 sends the first character state to the second computing device 210 and locally stores information to indicate that the character has moved to the second computing device 210. In one embodiment, the character state may represent a particular character in a game and the attributes of such character. Examples of such attributes include, but are not limited to, an image, items carried by character, health of character, or any other game character attributes. Further, the updated character state may include billing information, purchase history, accessory download credits, or any other financial information associated with the character.

As described above, a parent (or other person) can purchase and download game credits to the portable device 100 remotely. With game credits, a portable device 100 user may make purchases directly on the portable device 100 on various game or non-game applications that allow direct purchase. The portable device 100 may store many applications, each application possibly linked to different gaming platforms. For instance, a portable device 100 may store applications such as, but not limited to, Nintendo™-based applications, a Club Penguin™ application, a Webkinz™ application, etc. Each of these applications may support direct purchase options, where different characters, character accessories, or games can be purchased and downloaded directly. The parent can track when and what items were purchased by the kids or users of portable device 100. The transaction history may be updated to the portable device 100 when the portable device 100 connects to the Internet.

Game characters may be presented so as to give the illusion that they "live" on different platforms and formats. For example, Pokemon™ characters exist as physical trading cards or toys, but also in different video game platforms, such as Nintendo™ Game Boy, Nintendo™ GameCube, Nintendo™ Wii platforms, the Tamagotchi™, etc. Game characters may also interact on some web portal sites. Game characters exist distinctly and separately, without any coordination or cohesive platform that coordinates the character state between them and unifies the character experience for the user.

In one embodiment, the portable device 100 enables consistent game play over different media. For example, a parent may purchase a Pokemon™ trading card or stuffed toy at department store. The card or toy includes a special access code. The child enters this code on a web server host 220 or into the Pokemon™ video game on a gaming console (such as Nintendo™ GameBoy or Nintendo™ Wii). Using a wireless network, the portable device 100 communicates with the web host server 220 or directly with the game console and receives a character download. The character download includes the character information and character state, and the character is now stored on the portable device 100 memory element 125.

The character now "lives" on the portable device 100. When selected on the portable device 100, the character is animated and moves around the display 105 like a living entity. The character communicates to the user its needs, information the character wants to share, reminders of tasks the user needs to do, etc. The user has options to "care" for the character, similar to a living pet, including feeding the character, providing items or toys, and managing the character. Software on the portable device 100 allows the user to maintain and change the state of the character. The character appears alive and moves around, and can dynamically change and evolve, optionally to the point of having "offspring" or exhibiting other living behavior.

In an alternative embodiment, the first computing device 200 receives an updated second character state from the second computing device 210. The updated second character state typically results from the second computing device 210 updating the first character state of the first computing device 200 according to processing or modification performed on the second computing device 210. Such processing or modification may comprise application processing, game play, or any other computation.

Optionally, a portable device 100 may serve as a "bridge" platform between different game consoles or other types of computing devices to provide a consistent character experience across these platforms. The portable device 100 may be a personal wearable platform, providing the advantage of always being available and easily accessible. Character states may be seamlessly transferred between different gaming platforms. The game character and its state may then be transferred between platforms or different games that support that same character or across the same game that is played on different platforms.

For example, a user may play a Pokemon™ game on a Nintendo™ GameBoy. The Nintendo™ Gameboy uses a wireless link and synchronizes the most recent character information from the portable device 100. When the Pokemon™ game starts, a stored character such as Raichu™ appears on the Nintendo™ Gameboy, with the most recent updated character state from the users' last game on a Nintendo™ Wii.

The user may later want to play the Pokemon™ video game on the Nintendo™ Wii. The user turns on the Nintendo™ Wii, and the Nintendo™ Wii wirelessly detects that the portable device 100 is locally present and asks on the television screen (or other display used by the Nintendo™ Wii) if the user wants to connect to the portable device 100. If the user wants to connect the portable device 100 to the game console, the Nintendo™ Wii searches the local portable device memory element 125 for game state and character information related to the selected video game. The game starts with the user's preferences, previous state, and characters.

The consistent character experience may also include interactions with characters belonging to other users. Such interactions may occur over the Internet through a web server host 220 or locally when two or more portable devices 100 are brought within proximity of each other. Available characters may appear on the user's portable device 100, and the user can approve or reject the interaction. When approved, the character can be simulated to jump out of the portable device display 105 and into the display 105 of the other user's portable device 100. Or in the case of a battle, the other user's character may appear alongside the user's character, so both users may see each character. The character interaction may change the characteristics of the characters, such as strength, endurance, energy, etc., or the characters can exchange or trade items that they own, such as clothes, weapons, spells, special powers, etc.

Optionally, interaction may take the form of exchanging characters between users. The portable device 100 may store software to allow a user to trade characters when communicating with another user's portable device 100. The user may select the "trade" software and users within the same network or Bluetooth range would be listed. The user selects one or more other users and the characters belonging to the other users appear on the display 105. The user's own characters are also displayed on the display 105, and the visual presentation may be organized so as to distinguish the two sets of items (such as one set on the left and the other set on the right hand side of the display 105). Either user may offer one or more items up for trade, for example by dragging the characters from either side of the display 105 to the open middle section of the display 105. A confirm trade button on the display 105 swaps characters to opposite sides, completing the trade.

Once the game ends, the latest updates to the user's preferences, previous state, and characters may be stored back on the portable device 100. For example, the user may play with a Pikachu™ character in a Pokemon™ game, and the Pikachu™ character may gain strength points and evolve into a new character Raichu™

In an alternative embodiment, the character's state may be modified on the portable device 100 and synchronized over the Internet to a web server host 220. The next time the user plays the game on the web gaming portal, the characters are updated using the character game state from the portable device 100.

The portable device 100 may be configured and controlled to limit access to various functions. This is may be a mechanism for parents to control how and when the portable device 100 is used. The same mechanism also allows a parent to remotely provide new game content or characters to a child's portable device 100.

Figure 6:
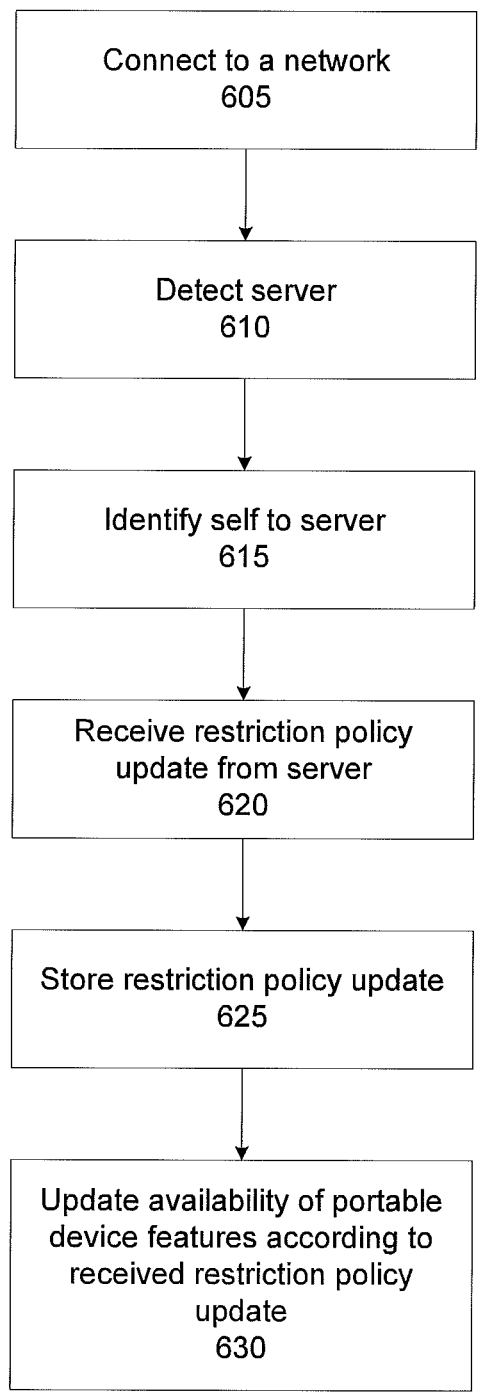
FIG. 6 is a flow diagram illustrating a method for implementing a restriction policy on the availability of features of a portable electronic data and communication device and updating the restriction policy over a network.

FIG. 6 is a flow diagram illustrating a method for implementing a restriction policy on the availability of features of a portable device 100, and for updating the restriction policy over a network, in accordance with an embodiment of the present invention. At step 605, a portable device 100 connects to a network. At step 610, the portable device 100 detects the presence of a web server host 220 or other computing node on the network, the web server host 220 configured to provide one or more restriction policy updates. At step 615, the portable device 100 identifies itself to the web server host 220. At step 620, the portable device 100 receives a restriction policy update from the web server host 220. At step 625, the portable device 100 stores the restriction policy update. At step 630, the portable device 100 updates the availability of portable device features according to the received restriction policy update. Optionally, the portable device 100 updates the display 105 to indicate updated feature availability.

Examples of such restriction policy criteria include, but are not limited to, limits on usage based on where the portable device is located, certain applications restricted by specific scheduled times, certain applications restricted after reaching certain usage time limits, limits on whom the portable device can connect to, or any other restriction criteria.

In one embodiment, a parent logs on to the web server host 220 for the portable device 100. There is a portable device configuration screen allowing the parent to do a restrict access to the certain functions of the portable device 100. The parent may set allowable times when these functions can be enabled or disabled. For instance, the parent configure the portable device 100 to enable the gaming functions outside of school time and only allow the clock function during school hours. Optionally, the portable device 100 may be configured to restrict all the game functions for a week, if the child is grounded.

In an alternative embodiment, the web server host 220 for the portable device 100 could provide information on how the portable device was being used, the amount of time spent using a given program, or the amount of game time used. The parent could set a time limit on the amount of game play or specific game functions, or set time limits on a specific game. In this way, a parent could set global time limits on games that synchronize game or character states with the portable device 100. This time limit can be set across multiple gaming platforms.

Optionally, the portable device 100 may have a feature to allow an authorized central entity within a certain proximity to restrict or defer transactions. For example, in a classroom, a teacher may have some degree of control over the functions of the portable device 100, pursuant to parental settings. Another function of the portable device could allow a teacher to use the portable device 100 for teaching purposes, such as having students respond to questions on it or taking surveys.

In such embodiments, the restriction policy may be automatically updated to the portable device when the portable device 100 is connected to the Internet. The portable device 100 may have wireless Internet access and can perform automatic synchronization updates to the portable device web server host 220, where the latest configuration and data gets transmitted to and from the portable device 100.

Optionally, parents may use the portable device 100 to track their child's location using an optional integrated GPS element 140. The portable device 100 may specify not only a current location of the child, but also a history of the child's location over a specified time period.

While certain exemplary embodiments have been described and shown in the accompanying drawings, it is to be understood that such embodiments are merely illustrative and not restrictive of the broad invention and that this invention is not limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principals of the present disclosure or the scope of the accompanying claims.

The invention claimed is:

1. On a first wireless portable device storing a first character state, a method for providing consistent character experience across a plurality of portable devices, comprising:

storing, in the first wireless portable device, a first application that is linked to a first platform and that supports direct purchase options from a server, including at least one of different characters, character accessories, and games;

storing, in the first wireless portable device, the first character state representing a particular character in the first application;

receiving by the first wireless portable device, user input that changes the first character state;

detecting by the first wireless portable device, a presence of a second wireless portable device in wireless range;

connecting to the second portable device; in response to connecting to the second portable device, displaying the character on a display of the second portable device for user approval;

in response to receiving the approval, simulating on the first wireless portable device the character jumping out of the first wireless portable device and into the display of the second portable device;

sending the first character state directly to the second portable device and locally storing information to the first wireless portable device indicating that the character has moved to the second portable device;

receiving an updated second character state from the second portable device, the updated second character state resulting from the second portable device updating the first character state according to modification on the second portable device; and storing the updated second character state and modifying the locally stored information to indicate that the character has moved back to the first portable device, wherein the first character and its state is sent between at least one of the same application running on different platforms and different applications that support the same character without the need for a server or centralized coordination of character states.

2. A wireless portable device for providing consistent character experience across the wireless portable device and a second portable device, comprising:

a memory storing a first application linked to a first platform, supporting direct purchase options from a server, including different characters, character accessories, games and further storing a first character state representing a particular character in the first application; and at least one processor, the at least one processor configured to:

receive user input that changes the first character state;

detect a presence of a second wireless portable device in wireless range, the second wireless device having a second gaming application that is linked to a second gaming platform that is different than the first gaming platform;

connect to the second wireless portable device;

in response to connecting to the second wireless portable device, display the character on a display of the second wireless portable device for user approval;

in response to receiving the approval, simulate on the first wireless portable device the character jumping out of the first wireless portable device and into the display of the second wireless portable device;

send the first character state directly to the second wireless portable device and locally store information to indicate that the character has moved to the second wireless portable device;

receive an updated second character state from the second wireless portable device, the updated second character state resulting from the second wireless portable device updating the first character state according to modification on the second wireless portable device; and store the updated second character state and modify the locally stored information to indicate that the character has moved back to the first wireless portable device;

wherein the first character and its state is sent between at least one of the same application running on different platforms and different applications that support the same character without need for the server or centralized coordination of character states.

\* \* \* \* \*